United States Patent
Yokoya et al.

(10) Patent No.: US 10,895,709 B2
(45) Date of Patent: Jan. 19, 2021

(54) LENS APPARATUS AND IMAGE CAPTURING APPARATUS INCLUDING THE SAME

(71) Applicant: CANON KABUSHIKI KAISHA, Tokyo (JP)

(72) Inventors: Maki Yokoya, Utsunomiya (JP); Yoshihisa Tashiro, Nikko (JP); Takayoshi Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 16/274,127

(22) Filed: Feb. 12, 2019

(65) Prior Publication Data

US 2019/0258017 A1   Aug. 22, 2019

(30) Foreign Application Priority Data

Feb. 20, 2018   (JP) .................................. 2018-028176

(51) Int. Cl.
*G02B 7/02* (2006.01)
*G02B 27/00* (2006.01)
*G02B 9/34* (2006.01)
*G02B 13/04* (2006.01)

(52) U.S. Cl.
CPC ............... *G02B 7/021* (2013.01); *G02B 9/34* (2013.01); *G02B 13/04* (2013.01); *G02B 27/0025* (2013.01)

(58) Field of Classification Search
CPC .......... G02B 7/021; G02B 9/34; G02B 13/04; G02B 27/0025; G02B 15/14
USPC ......................................................... 359/819
See application file for complete search history.

(56) References Cited

U.S. PATENT DOCUMENTS 9,715,092 B2    7/2017  Inomoto
2016/0356997 A1*  12/2016  Inomoto ................ G02B 13/16

FOREIGN PATENT DOCUMENTS

JP          2008-197541 A       8/2008

* cited by examiner

*Primary Examiner* — James R Greece
(74) *Attorney, Agent, or Firm* — Canon U.S.A., Inc. IP Division

(57) ABSTRACT

A lens apparatus includes an optical system L0 including a plurality of lenses. The optical system L0 is changeable to a first state in which a focal length of the optical system L0 is a first focal length and a second state in which the focal length is a second focal length shorter than the first focal length, by changing one or some of the plurality of lenses. The maximum image heights and maximum angle of views in the first state and the second state are substantially constant and satisfy a predetermined condition.

14 Claims, 10 Drawing Sheets

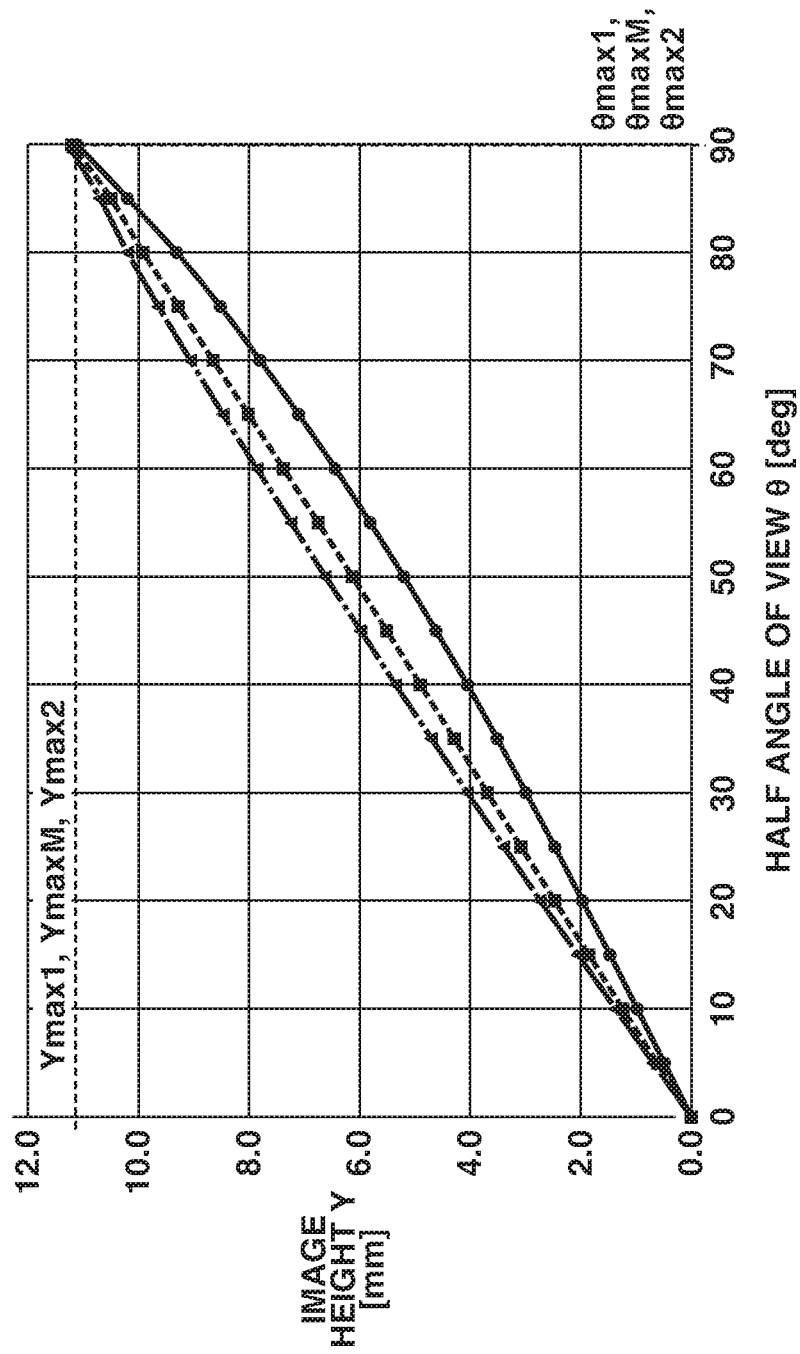

LENS APPARATUS AND IMAGE CAPTURING APPARATUS INCLUDING THE SAME

BACKGROUND

Field of the Disclosure

The present disclosure relates to a lens apparatus suitable for use in an image capturing apparatus, such as a digital video camera, digital still camera, broadcasting camera, silver-halide film camera, and monitoring camera.

Description of the Related Art

If a projection method used by an imaging optical system is different, an acquired image appears differently. For example, in a case in which an orthogonal projection method or equisolid angle projection method is used, the image magnification is lower at peripheral regions of a screen than at a central region of the screen. In a case in which stereographic projection method is used, the image magnification is lower at the central region of the screen than at the peripheral regions of the screen.

If image magnification at a specific position is decreased, the resolution at the position becomes lower than those at the other positions. Thus, if the projection method is changeable in a single lens apparatus, an adequate resolution for the purpose of imaging and situation can be acquired with respect to a subject of interest on a screen while a wide angle of view is maintained.

Japanese Patent Application Laid-Open No. 2008-197541 discusses an optical system that is capable of changing a projection method by moving, in an optical axis direction, a dome-shaped lens which is disposed closest to the object side in the optical system and does not have much optical power.

SUMMARY

The present disclosure is directed to a technique for realizing a lens apparatus capable of acquiring an adequate resolution for a desired subject.

According to an aspect of the present invention, a lens apparatus includes an optical system including a plurality of lenses, wherein the optical system is changeable to a first state in which a focal length of the optical system is a first focal length and a second state in which the focal length of the optical system is a second focal length shorter than the first focal length, by changing one or some of the plurality of lenses of the optical system, and wherein the following conditional expressions are satisfied:

$$0.90 < Y_{max1}/Y_{max2} < 1.10,$$

$$0.90 < \theta_{max1}/\theta_{max2} < 1.10,$$

$$0.04 < \Delta Y_{max} < 0.50, \text{ and}$$

$$1.05 < fL/fS < 4.00,$$

where $Y_{max1}$ is a maximum image height in the first state, $Y_{max2}$ is a maximum image height in the second state, $\theta_{max1}$ is a maximum half angle of view in the first state, and $\theta_{max2}$ is a maximum half angle of view in the second state, $Y_1(\theta)$ is an image height corresponding to a half angle of view $\theta$ ($0 \leq \theta \leq \theta_{max1}$) in the first state, $Y_2(\theta)$ is an image height corresponding to a half angle of view $\theta$ ($0 \leq \theta \leq \theta_{max2}$) in the second state, $\Delta Y_{max}$ is a maximum value of $\Delta Y(\theta)$ with respect to $\theta$ which is defined as $\Delta Y(\theta) = |Y_1(\theta)/Y_{max1} - Y_2(\theta)/Y_{max2}|$, and fL is the first focal length, and fS is the second focal length.

Further features of the present invention will become apparent from the following description of exemplary embodiments with reference to the attached drawings.

BRIEF DESCRIPTION OF THE DRAWINGS

FIG. 2 is a diagram illustrating the relationship between a half angle of view and an image height in the optical system according to the first exemplary embodiment.

DESCRIPTION OF THE EMBODIMENTS

Figure 1:
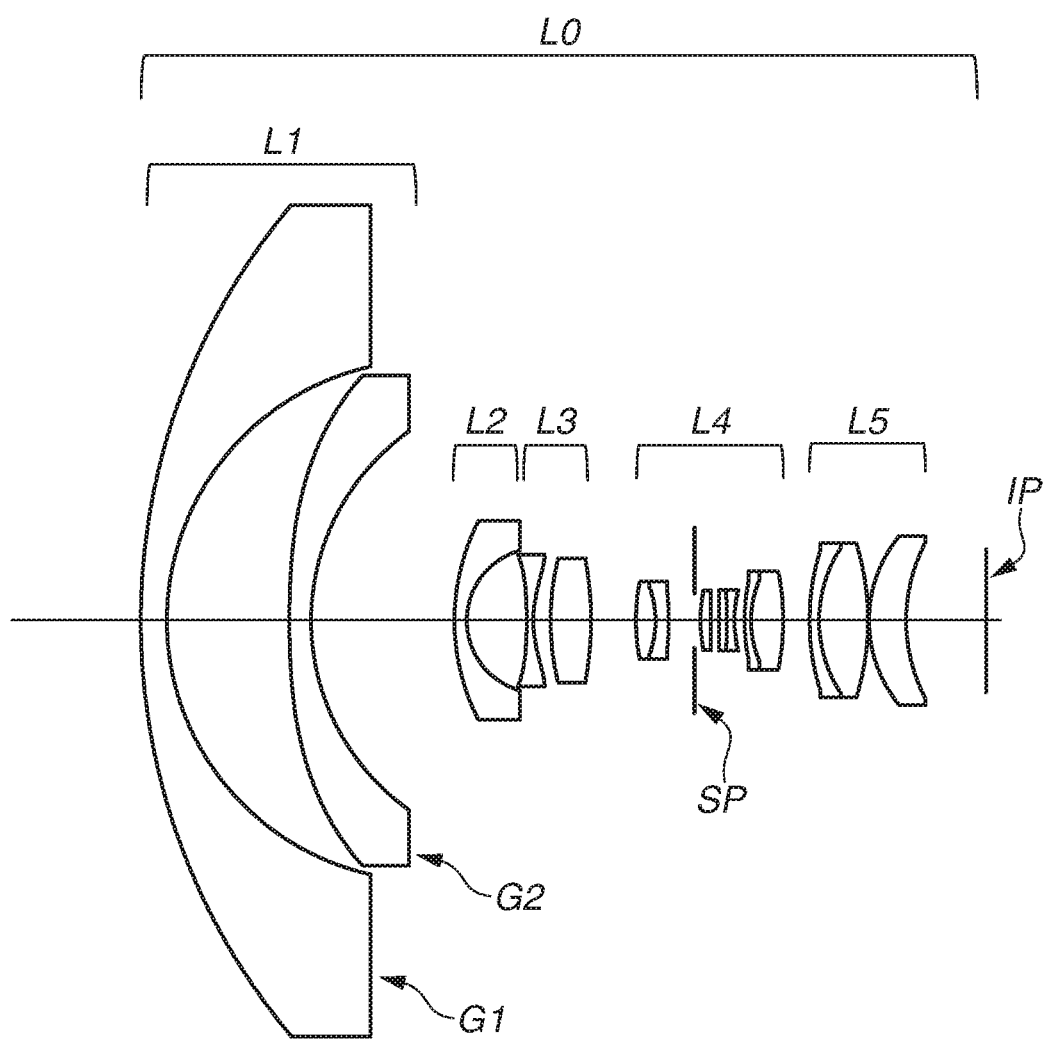
FIG. 1 is a cross-sectional view illustrating an optical system according to a first exemplary embodiment.

Prior to the description of a lens apparatus according to an exemplary embodiment of the present invention and an image capturing apparatus including the lens apparatus, definitions of terms used herein will be described below.

The term "maximum image height" refers to the half value (radius of image circle) of an effective image circle diameter of an optical system. The term "effective image circle diameter" refers to a circular region where a light ray having passed through the optical system is formed on an image plane.

The term "maximum half angle of view" refers to an angle of view (angle formed by a light ray with an optical axis) of an off-axis principal ray that reaches the maximum image height.

The term "imaging state" refers to a state of the optical system being usable in imaging. In general, a single lens apparatus is configured to be in one of a plurality of imaging states that differs from each other in lens position and/or F-number. A state of the optical system being not expected to be used in imaging is not included in the imaging states. An example of the state of the optical system being not expected to be used in imaging is a retraction state of a retractable lens. Further, a state in which a light ray effective region of a built-in converter lens configured to be removable with respect to an optical path is inserted only partially in the optical path in a lens apparatus including the converter lens (i.e., half-inserted state) is also included in the state of the optical system being not expected to be used in imaging.

Next, a lens apparatus and an image capturing apparatus including the lens apparatus according to various exemplary embodiments of the present invention will be described below with reference to the drawings.

FIGS. 1, 4, 7A, and 7B are cross-sectional views each illustrating an optical system L0 of a lens apparatus according to first to third exemplary embodiments. In each cross-sectional view of the lenses, an aperture stop SP and an image plane IP are illustrated. The lens apparatus in each exemplary embodiment includes a barrel (not illustrated) holding the optical system L0, in addition to the optical system L0.

The lens apparatus in each exemplary embodiment is configured in such a manner that the focal length is changeable by changing one or some of the lenses included in the optical system L0. The phrase "changing one or some of the lenses" refers to moving the lens(es) included in the optical system L0 in an optical axis direction, removing one or some of the lenses in the optical system L0 from an optical path, adding an additional lens(es) to the optical system L0, and/or replacing one or some of the lenses included in the optical system L0 with another lens. The focal length in the optical system L0 can be changed by either discontinuously or continuously changing one or some of the lenses included in the optical system L0.

In this way, the state of the optical system L0 in each exemplary embodiment can be changed between a plurality of imaging states of different focal lengths. Further, the plurality of imaging states of the lens apparatus according to each exemplary embodiment includes a first state and a second state in which the focal length is shorter than the focal length in the first state. The first state and the second state satisfy all conditional expressions (1) to (4) described below.

According to the first and second exemplary embodiments, the focal length is changed by moving one or some of the lenses in the optical system L0 in the optical axis direction, as described below. According to each of the exemplary embodiment, a set of lenses relatively movable in the optical axis direction in changing the focal length will be referred to as "lens unit". The lens unit may include only a single lens or a plurality of lenses. Further, in the lens apparatus according to the third exemplary embodiment, the focal length is changed by replacing one or some of the lenses of the optical system L0 with another lens.

The lens apparatus according to each of the exemplary embodiments is configured in such a manner that the maximum half angle of views and maximum image heights in the first state and the second state are substantially constant. Thus, if the imaging state of the optical system L0 is changed from the first state to the second state, the magnification at a central portion of the screen changes while the maximum half angle of view and the maximum image height are maintained substantially constant. In other words, in the optical system L0 according to each of the exemplary embodiments, the projection method in the first state is different from the projection method in the second state.

In general, since the number of pixels of an image capturing element for use in imaging is limited, if the angle of an optical system is widened, the number of pixels per angle of view decreases. Therefore, it is difficult to capture an image having a high resolution in every angle of view while the angle of an optical system is widened. However, the magnifications at central and peripheral portions of an image can be set variable by setting the projection method changeable as in the lens apparatus according to each of the exemplary embodiments. With such a configuration, it is possible to increase the magnification at a region with a subject of interest therein while increasing the angle of the optical system, so that an adequate resolution for a desired subject is acquirable regardless of the position and composition of the desired subject.

According to each of the exemplary embodiments, the first state and the second state satisfy the following conditional expressions (1) to (4):

$$0.90 < Y\max1/Y\max2 < 1.10, \tag{1}$$

$$0.90 < \theta\max1/\theta\max2 < 1.10, \tag{2}$$

$$0.04 < \Delta Y\max < 0.50, \text{ and} \tag{3}$$

$$1.05 < fL/fS < 4.00. \tag{4}$$

In the conditional expressions (1) to (4), Ymax1 is the maximum image height in the first state, and Ymax2 is the maximum image height in the second state. Further, θmax1 is the maximum half angle of view in the first state, and θmax2 is the maximum half angle of view in the second state. Further, fL is a first focal length which is the focal length of the optical system L0 in the first state, and fS is a second focal length which is the focal length of the optical system L0 in the second state. Further, $\Delta Y(\theta)$ is defined as the following conditional expression (5):

$$\Delta Y(\theta) = |Y1(\theta)/Y\max1 - Y2(\theta)/Y\max2| \tag{5},$$

where $Y1(\theta)$ is the image height corresponding to the half angle of view θ (0≤θ≤θmax1) in the first state, and $Y2(\theta)$ is the image height corresponding to the half angle of view θ (0≤θ≤θmax2) in the second state. At this time, the maximum value of $\Delta Y(\theta)$ with respect to θ is denoted by ΔYmax.

The following describes the technical significances of the conditional expressions (1) to (4).

The conditional expressions (1) and (2) indicate that the maximum image height and the maximum half angle of view in the first state are substantially equal to the maximum image height and the maximum half angle of view in the second state. Exceeding the upper limit value or lower limit value of the numerical ranges of the conditional expressions (1) and (2) is undesirable because, in this case, a subject image in a peripheral region of a screen may be trimmed or the pixels of the image capturing element may be wasted if the imaging state is changed between the first state and the second state.

It is desirable to set the numerical ranges of the conditional expressions (1) and (2) as expressed by the following conditional expressions (1a) and (2a):

$$0.95 < Y\max1/Y\max2 < 1.05, \text{ and} \tag{1a}$$

$$0.95 < \theta\max1/\theta\max2 < 1.05. \tag{2a}$$

The conditional expression (3) relates to the magnitude of a change in the projection method that is associated with a change in the imaging state between the first state and the second state. In the conditional expression (5), $\Delta Y(\theta)$ is the amount of change in the image height corresponding to the half angle of view θ in the case of changing the imaging state of the lens apparatus from the first state to the second state. Specifically, a large maximum value ΔYmax of $\Delta Y(\theta)$ with respect to θ indicates that the image magnification at a region of the screen is changed significantly in association with a change in the imaging state from the first state to the second state. Thus, a large maximum value ΔYmax indicates that the projection methods in the first state and the second state are significantly changed.

In a case in which the value of ΔYmax is less than the lower limit value of the conditional expression (3), it is difficult to sufficiently change the image magnifications at central and peripheral regions of the screen. It is thus difficult to acquire an adequate resolution with respect to a subject of interest by changing the imaging state between the first state and the second state. The value of ΔYmax that exceeds the upper limit value of the conditional expression (3) is undesirable because, in this case, it becomes difficult to suitably correct an aberration of the optical system L0 although it is possible to significantly change the magnifications at the central and peripheral regions of the screen.

It is desirable to set the numerical range of the conditional expression (3) as expressed by the following conditional expression (3a):

$$0.05 < \Delta Y\text{max} < 0.35. \tag{3a}$$

The conditional expression (4) defines the focal length ratio between the first state and the second state that is required to sufficiently change the image magnifications at the central and peripheral regions of the screen while satisfying the conditional expressions (1) and (2).

In a case in which the focal length ratio between the first state and the second state is so low that the focal length ratio is less than the conditional expression (4), it is not possible to sufficiently change the image magnification at the central region of the screen between the first state and the second state. Thus, it is difficult to acquire an adequate resolution with respect to a subject of interest by changing the imaging state between the first state and the second state. Further, the focal length ratio between the first state and the second state that exceeds the upper limit value of the conditional expression (4) is undesirable because, in this case, it is difficult to suitably correct an aberration of the optical system L0 although it is possible to significantly change the magnifications at the central and peripheral regions.

It is desirable to set the numerical range of the conditional expression (4) as expressed by the following conditional expression (4a):

$$1.10 < fL/fS < 2.50. \tag{4a}$$

Next, the following describes a desirable configuration of the optical system L0.

Desirably, each of the maximum half angle of views in the first state and the second state is large to a certain degree. Thus, the optical system L0 desirably satisfies the following conditional expressions (6) and (7):

$$80° < \theta\text{max}1 < 110°, \text{ and} \tag{6}$$

$$80° < \theta\text{max}2 < 110°. \tag{7}$$

The conditional expressions (6) and (7) each define the maximum half angle of view in the first state or the second state. The half angle of view that is less than the lower limit values of the conditional expressions (6) and (7) is undesirable because, in this case, the angle of view that is captured by the optical system L0 becomes excessively narrow. Further, in the case in which the half angle of view is less than the lower limit values of the conditional expressions (6) and (7), a subject that is present in the angle of view is captured at a high resolution with ease, and thus the merit produced by satisfying the conditional expressions (1) to (4) is likely to decrease. Further, the half angle of view that exceeds the upper limit values of the conditional expressions (6) and (7) is undesirable because, in this case, the size of the optical system L0 increases.

More desirably, the maximum half angle of view in every possible imaging state of the optical system L0 is 80° or wider.

Further, it is desirable to set the numerical ranges of the conditional expressions (6) and (7) as expressed by the following conditional expressions (6a) and (7a):

$$85° < \theta\text{max}1 < 95°, \text{ and} \tag{6a}$$

$$85° < \theta\text{max}2 < 95°. \tag{7a}$$

Further, the optical system L0 desirably includes two or more negative lenses on the object side of the aperture stop SP. A case in which the number of negative lenses disposed on the object side of the aperture stop SP is one or less is undesirable because, in this case, the negative refractive power at the object side of the aperture stop SP becomes weak and, thus, the amount of generated distortion/aberration decreases and the angle of view of the optical system L0 becomes narrow.

Further, it is desirable to satisfy the following conditional expression (8):

$$1.00 < (G1R1+G1R2)/(G1R1-G1R2) < 4.00, \tag{8}$$

where G1R1 is the object-side curvature radius of a first negative lens G1 which is the negative lens disposed closest to the object among the negative lenses of the optical system L0, and G1R2 is the image-side curvature radius of the first negative lens G1.

The conditional expression (8) relates to the shape factor of the first negative lens G1. The shape factor of the first negative lens G1 that is greater than the lower limit value of the conditional expression (6) indicates that the first negative lens G1 is a meniscus lens. The first negative lens G1 is configured to be a meniscus lens so that light of a wider angle of view is receivable and, thus, the angle of view of the optical system L0 is further widened. Further, the shape factor of the first negative lens G1 that exceeds the upper limit value of the conditional expression (8) is undesirable because, in this case, the negative refractive power of the first negative lens G1 is weakened and the amount of generated distortion/aberration is decreased and, thus, it becomes difficult to widen the angle of view of the optical system L0.

It is desirable to set the numerical range of the conditional expression (8) as expressed by the following conditional expression (8a):

$$1.30 < (G1R1+G1R2)/(G1R1-G1R2) < 3.70. \tag{8a}$$

Further, it is desirable to satisfy the following conditional expression (9):

$$0.80 < fG1/fG2 < 3.50, \tag{9}$$

where fG2 is the focal length of a second negative lens G2 which is the second one of the negative lenses of the optical system L0 when counted from the object side, and fG1 is the focal length of the first negative lens G1.

The conditional expression (9) relates to the focal length ratio between the first negative lens G1 and the second negative lens G2. The negative refractive index of the second negative lens G2 that is high enough for the value of fG1/fG2 to exceed the upper limit value of the conditional expression (9) is undesirable because, in this case, distortions, aberrations, etc. are not sufficiently corrected. The negative refractive power of the first negative lens G1 that is high enough for the value of fG1/fG2 to be less than the lower limit value of the conditional expression (9) is undesirable because, in this case, either it is difficult to sufficiently correct distortions and aberrations or it is difficult to sufficiently widen the angle of view of the optical system L0.

It is desirable to set the numerical range of the conditional expression (9) as expressed by the following conditional expression (9a):

$$0.90 < fG1/fG2 < 3.30. \quad (9a)$$

In the case of changing the imaging state between the first state and the second state by moving the lens unit of the optical system L0 in the optical axis direction as in the lens apparatuses according to the first and second exemplary embodiments, it is desirable to satisfy the following conditional expression (10):

$$0.4 < Mfmax < 1.08. \quad (10)$$

In the conditional expression (10), Mfmax is the maximum value of Mfn with respect to n, where Mn is the amount of movement associated with a change in the imaging state of the nth lens unit Ln between the first state and the second state, fLn is the focal length of the nth lens unit Ln, and Mfn=|Mn/fLn|. Further, n is an integer of 1 to N, where N is the number of lens units forming the optical system L0.

The conditional expression (10) relates to the amount of movement associated with a change in the imaging state of the lens unit of the optical system L0 between the first state and the second state. The value of Mfmax that is less than the lower limit value of the conditional expression (10) is undesirable because, in this case, the change in the focal length between the first state and the second state becomes excessively small and, thus, it becomes difficult to sufficiently change the image magnification for a subject of interest between the first state and the second state and it thus becomes difficult to acquire an adequately high resolution for the subject of interest, or the sensitivity with respect to the focal length of each lens unit of the optical system L0 becomes excessively high and, thus, it becomes difficult to manufacture the optical system L0.

The value of Mfmax that exceeds the upper limit value of the conditional expression (10) is undesirable because, in this case, the size of the optical system L0 increases.

It is desirable to set the numerical range of the conditional expression (10) as expressed by the following conditional expression (10a):

$$0.5 < Mfmax < 1.0. \quad (10a)$$

Further, in the case of changing the imaging state between the first state and the second state by moving the lens unit of the optical system L0 in the optical axis direction as in the lens apparatuses of the first and second exemplary embodiments described below, the optical system L0 desirably includes one or more aspherical surfaces satisfying the following conditional expression (11):

$$0.15 < |(hmax-hmin)/EA|. \quad (11)$$

In the conditional expression (11), EA is the effective diameter of the aspherical surface. Further, hmax is the height, from the optical axis, of the position at which a principal ray of an outermost off-axis light ray (light ray focused at the maximum image height) is incident on the aspherical surface at the time of focusing on an object at infinity in the first state. Further, hmin is the height, from the optical axis, of the position at which the principal ray of the outermost off-axis light ray is incident on the aspherical surface at the time of focusing on an object at infinity in the second state.

The conditional expression (11) relates to a change in the light ray height of an outermost off-axis principal ray between the first state and the second state on a specific optical surface.

An aspherical surface is disposed on a surface where a change in the light ray height of the principal ray of the outermost off-axis light ray between the first state and the second state is significant. In this way, the projection method is efficiently changeable while the maximum half angle of view and the maximum image height of the optical system L0 are maintained substantially constant. In the case in which the value is less than the lower limit value of the conditional expression (11), it is difficult to sufficiently change the projection method while maintaining the maximum half angle of view and the maximum image height of the optical system L0 substantially constant and, thus, it is difficult to acquire an adequately high resolution for a subject of interest.

A large value of |(hmax-hmin)/EA| indicates that the height of a light ray incident on the aspherical surface changes significantly in the first state and the second state. In this case, the amount of movement of the lens unit in the case of a change between the first state and the second state becomes large and, thus, the size of the lens apparatus becomes large. Thus, it is desirable to set the numerical range of the conditional expression (11) as expressed by the following conditional expression (11a):

$$0.20 < |(hmax-hmin)/EA| < 0.37. \quad (11a)$$

Next, the lens apparatus in each exemplary embodiment will be described in detail below.

The optical system L0 of the lens apparatus in the first exemplary embodiment is as illustrated in FIG. 1. The optical system L0 according to the present exemplary embodiment includes a first lens unit L1 having a negative refractive power, a second lens unit L2 having a negative refractive power, a third lens unit L3 having a positive refractive power, a fourth lens unit L4 having a positive refractive power, and a fifth lens unit L5 having a positive refractive power which are arranged in this order from the object side to the image side. In the optical system L0 according to the present exemplary embodiment, the focal length is continuously changeable between the first state and the second state satisfying all the above-described conditional expressions (1) to (4) by changing an interval between adjacent lens units on the optical axis.

FIG. 2 illustrates the image height in the first state, an intermediate state, and the second state with respect to the half angle of view θ in the optical system L0 in the present exemplary embodiment. As used herein, the term "intermediate state" refers to an imaging state in which the focal length is shorter than the focal length in the first state and longer than the focal length in the second state (i.e., state in which the imaging state is being changed between the first state and the second state). As illustrated in FIG. 2, the imaging state of the optical system L0 according to the present exemplary embodiment is changeable from the first state of equisolid angle projection through the intermediate state of equidistant projection to the second state of stereographic projection, by changing the intervals between the lens units.

Further, in FIG. 2, Ymax1, YmaxM, and Ymax2 are the maximum image heights in the first state, the intermediate state, and the second state, respectively. Further, θmax1, θmaxM, and θmax2 are the maximum half angle of views in the first state, the intermediate state, and the second state, respectively. As illustrated in FIG. 2, Ymax1, YmaxM, and Ymax2 are substantially equal, and θmax1, θmaxM, and θmax2 are substantially equal. Specifically, in the optical system L0 in the present exemplary embodiment, the maximum image height and the maximum half angle of view are maintained substantially constant at the time of changing the imaging state between the first state and the second state.

Figure 3A:
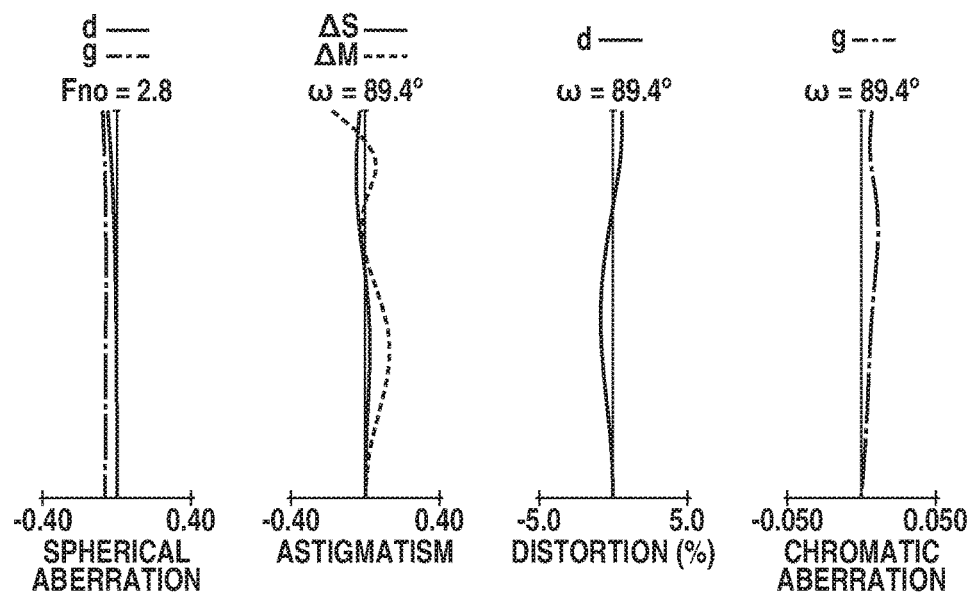
FIGS. 3A, 3B, and 3C are aberration diagrams illustrating aberrations in the optical system according to the first exemplary embodiment.
Figure 3B:
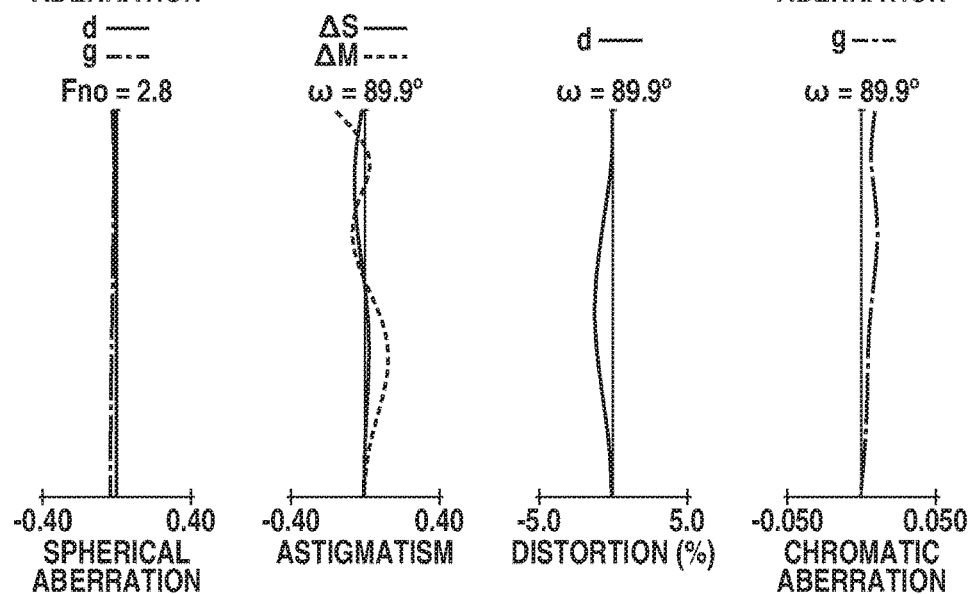
Figure 3C:
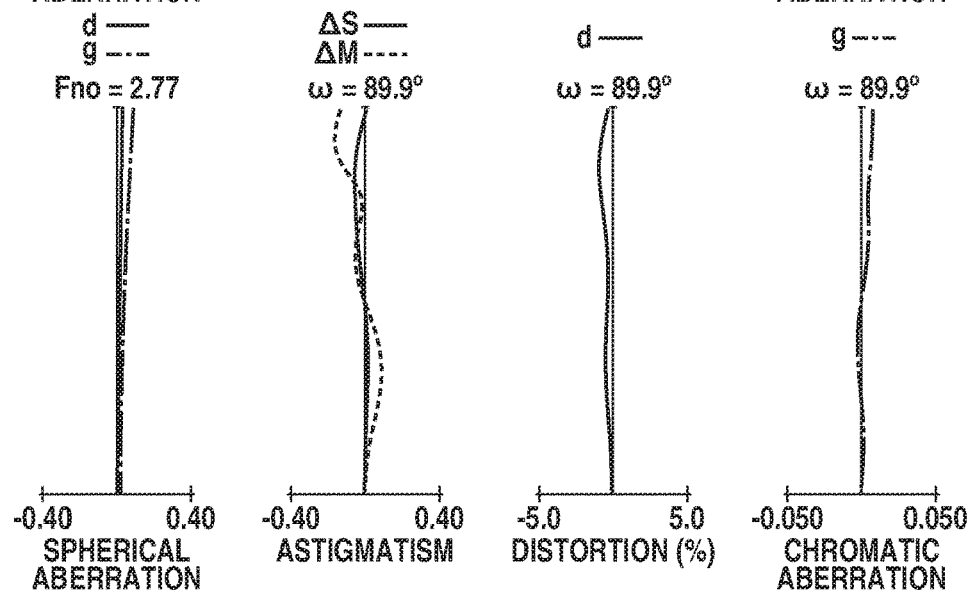

FIGS. 3A, 3B, and 3C are aberration diagrams illustrating aberrations in the optical system L0 according to the present exemplary embodiment at the time of focusing on an object at infinity in the first state, the intermediate state, and the second state.

In the aberration diagrams, the F-number is represented by "Fno", and the half angle of view (degrees) which is an angle of view obtained by paraxial calculation is represented by "ω". In the spherical aberration diagrams, the d-line (wavelength 587.56 nm) is represented by "d", and the g-line (wavelength 435.835 nm) is represented by "g".

In the astigmatism diagrams, ΔS represents the d-line on a sagittal image plane, and ΔM represents the d-line on a meridional image plane. Distortion aberration illustrated in the astigmatism diagrams is the distortion aberration at the d-line. The distortion aberration in the first state is based on the equisolid angle projection, the distortion aberration in the intermediate state is based on the equidistant projection, and the distortion aberration in the second state is based on the stereographic projection.

Further, in the chromatic aberration diagrams, the amount of chromatic aberration at the g-line with respect to the d-line is represented by "g".

In the lens apparatus according to the second exemplary embodiment, the imaging state is changed between the first state and the second state by moving the lens unit included in the optical system L0 in the optical axis direction, as in the first exemplary embodiment. However, the lens configuration of the optical system L0 is different from the lens configuration according to the first exemplary embodiment.

Figure 4:
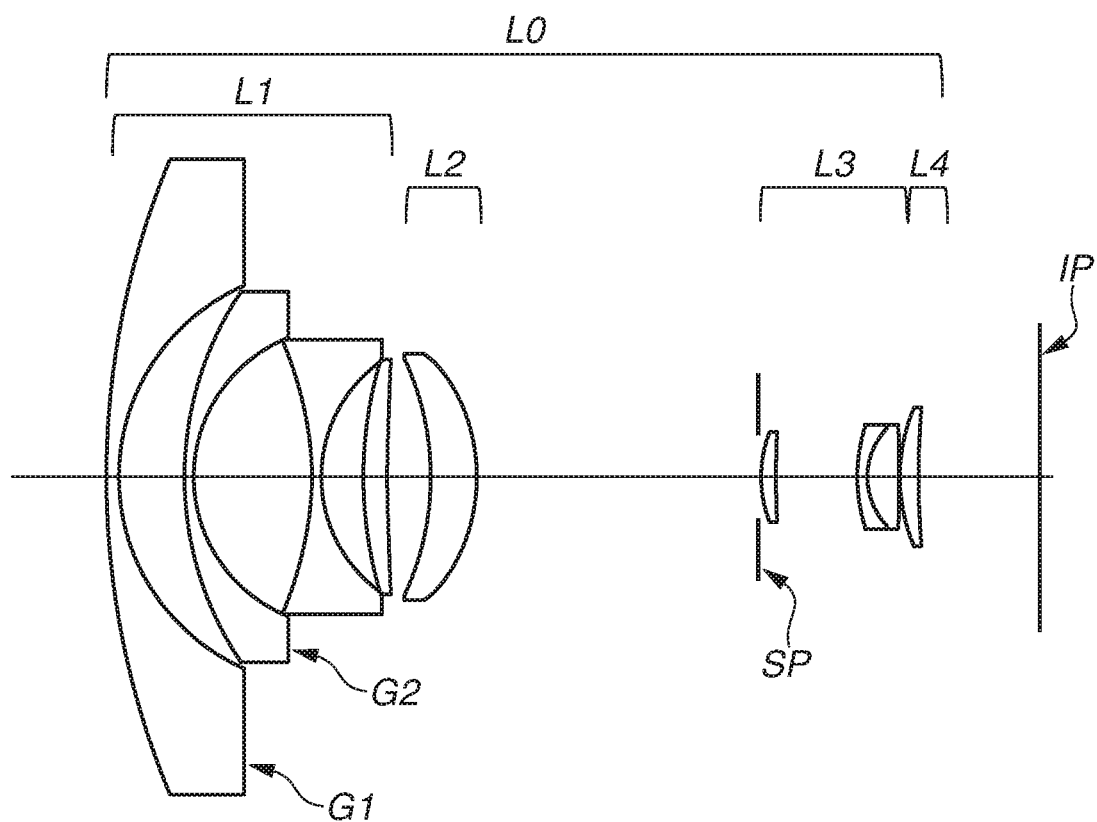
FIG. 4 is a cross-sectional view illustrating the optical system according to a second exemplary embodiment.

The optical system L0 of the lens apparatus according to the present exemplary embodiment is as illustrated in FIG. 4. The optical system L0 according to the present exemplary embodiment includes the first lens unit L1 having a negative refractive power, the second lens unit L2 having a positive refractive power, the third lens unit L3 having a positive refractive power, and the fourth lens unit L4 having a positive refractive power, which are arranged in this order from the object side to the image side.

Figure 5:
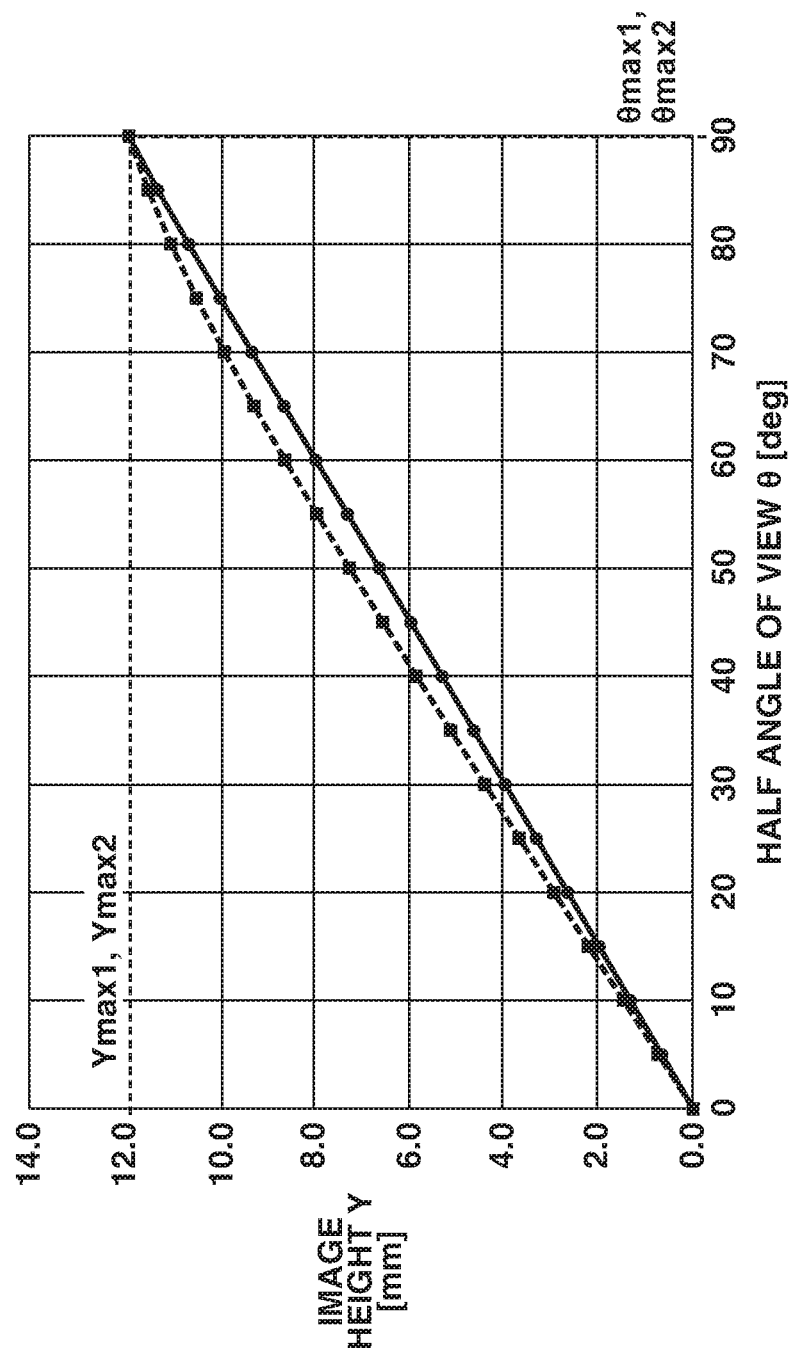
FIG. 5 is a diagram illustrating the relationship between a half angle of view and an image height in the optical system according to the second exemplary embodiment.

FIG. 5 is a diagram illustrating the image height in the first state and the second state with respect to the half angle of view θ in the optical system L0 according to the present exemplary embodiment. As illustrated in FIG. 5, the imaging state of the optical system L0 according to the present exemplary embodiment is changeable from the first state of equisolid angle projection to the second state of equidistant projection, by changing the intervals between the lens units.

Further, in FIG. 5, Ymax1 and Ymax2 are the maximum image heights in the first state and the second state, respectively. Further, θmax1 and θmax2 are the maximum half angle of views in the first state and the second state, respectively. As illustrated in FIG. 5, Ymax1 and Ymax2 are substantially equal, and θmax1 and θmax2 are substantially equal. Specifically, the maximum image height and the maximum half angle of view in the optical system L0 according to the present exemplary embodiment are maintained substantially constant at the time of changing the imaging state between the first state and the second state.

Figure 6A:
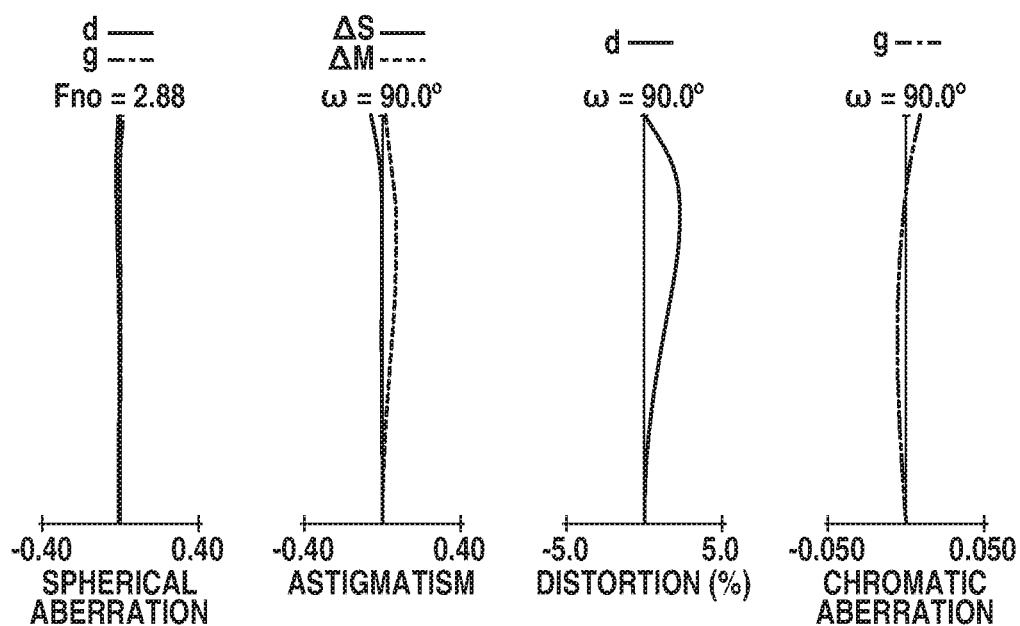
FIGS. 6A and 6B are aberration diagrams illustrating aberrations in the optical system according to the second exemplary embodiment.
Figure 6B:
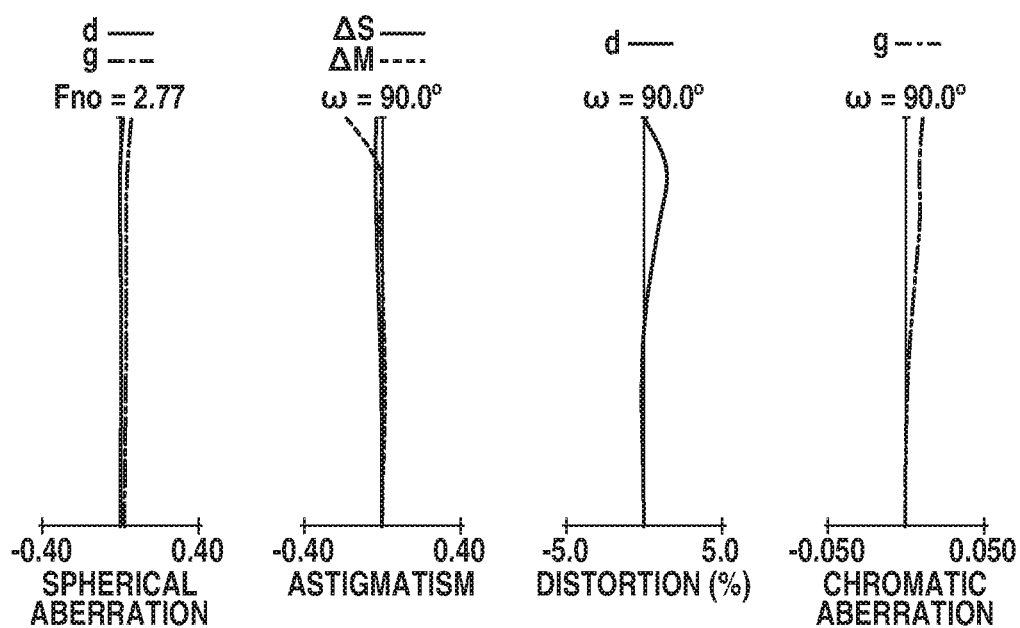

FIGS. 6A and 6B are aberration diagrams illustrating aberrations in the optical system L0 according to the present exemplary embodiment at the time of focusing on an object at infinity in the first state and the second state.

The distortion aberration in the first state is based on the equisolid angle projection, and the distortion aberration in the second state is based on the equidistant projection.

The lens apparatus in the third exemplary embodiment is different from the lens apparatuses according to the first and second exemplary embodiments in that the imaging state is changed between the first state and the second state by replacing one or more of the lenses of the optical system L0 with another lens. The term "replacing" refers to the retracting of one or some of the lenses of the optical system L0 from the optical axis of the optical system L0 and inserting another lens onto the optical axis of the optical system L0.

Figure 7A:
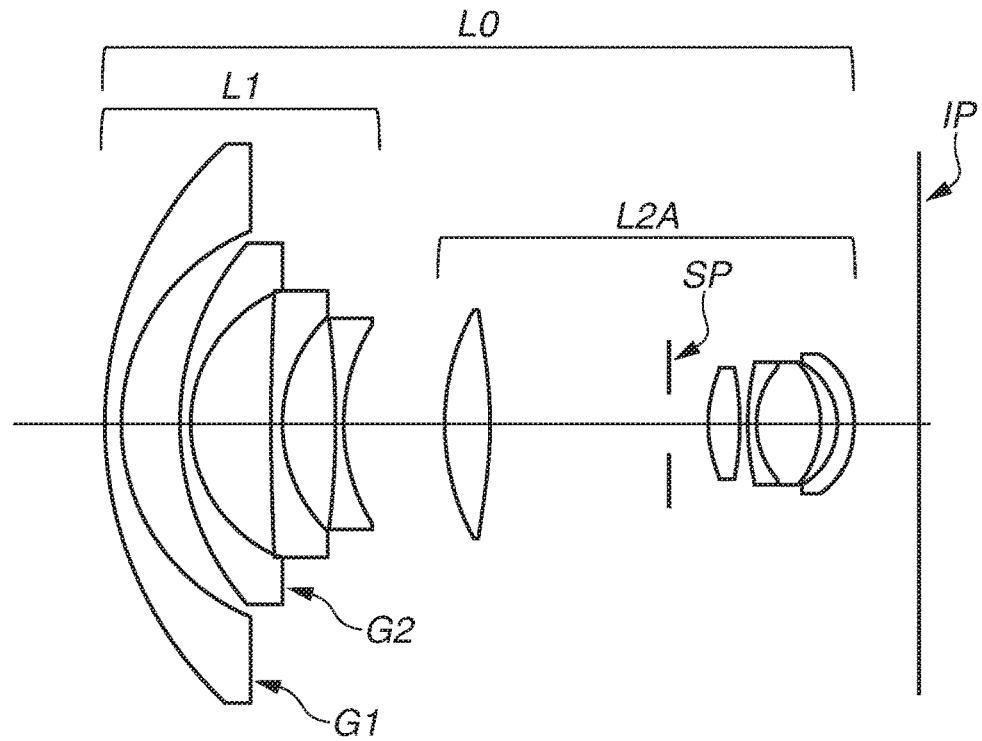
FIGS. 7A and 7B are cross-sectional views illustrating the optical system according to a third exemplary embodiment.
Figure 7B:
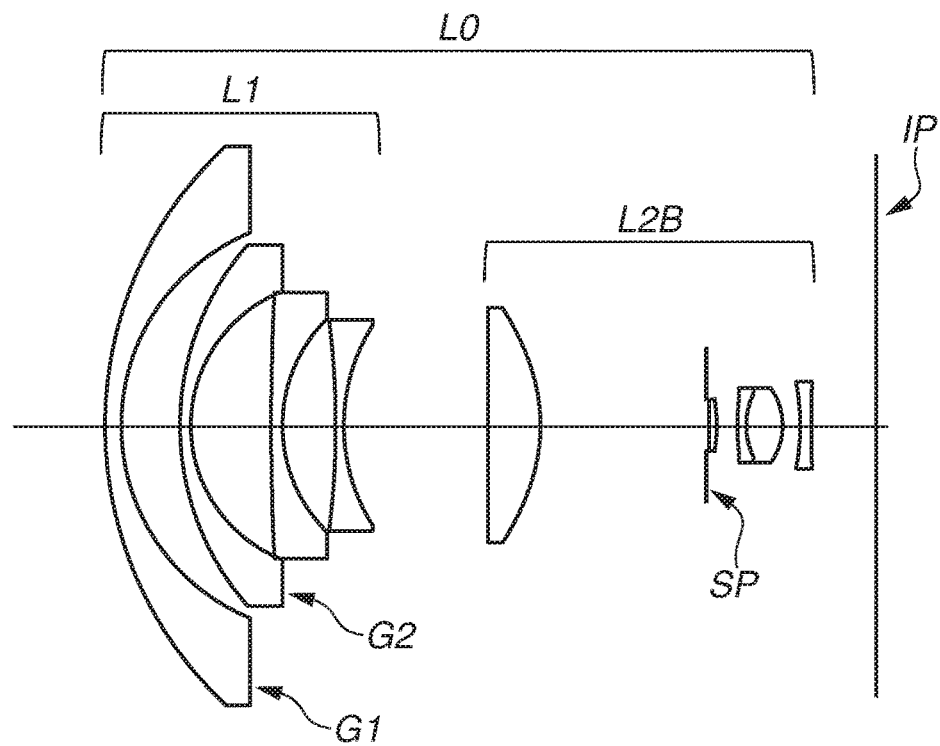

FIGS. 7A and 7B are cross-sectional views illustrating the optical system L0 of the lens apparatus according to the present exemplary embodiment. FIG. 7A is a cross-sectional view illustrating the optical system L0 in the first state according to the present exemplary embodiment, and FIG. 7B is a cross-sectional view illustrating the optical system L0 in the second state according to the present exemplary embodiment.

The optical system L0 according to the present exemplary embodiment includes a partial optical system L1 and a partial optical system L2A or a partial optical system L2B, which are arranged in this order from the object side to the image side. The lens apparatus according to the present exemplary embodiment includes a space to allow the partial optical systems L2A and L2B to be retracted from the optical axis, and is configured in such a manner that the partial optical system L2A is replaceable by the partial optical system L2B.

In the optical system L0 according to the present exemplary embodiment, the imaging state is discontinuously changeable between the first state and the second state by replacing the partial optical system L2A with the partial optical system L2B. The partial optical system L1 corresponds to a first partial optical system which remains unchanged between the first state and the second state. One of the partial optical systems L2A and L2B corresponds to a second partial optical system which is disposed on the image side of the first partial optical system and retracted from the optical axis in association with a change in the imaging state between the first state and the second state. The other one of the partial optical systems L2A and L2B corresponds to a third partial optical system which is inserted to the image side of the first partial optical system in the optical path of the optical system L0 in association with a change in the imaging state between the first state and the second state.

While the two replaceable partial optical systems, i.e., the partial optical systems L2A and L2B, are described as an example of replaceable partial optical systems according to the present exemplary embodiment, the number of replaceable partial optical systems can be three or more.

Further, in the case of changing the imaging state between the first state and the second state by replacing one or more of the lenses of the optical system L0 with another lens, it is desirable to replace a lens having a small effective diameter with another lens. Thus, the partial optical system L1 disposed closest to the object, at which the effective diameter is large, desirably remains unchanged between the first state and the second state, as in the present exemplary embodiment. The phrase "remains unchanged between the first state and the second state" indicates that no lens replacement is conducted. The partial optical system L1 can be configured to be moved in the optical axis direction between the first state and the second state.

Figure 8:
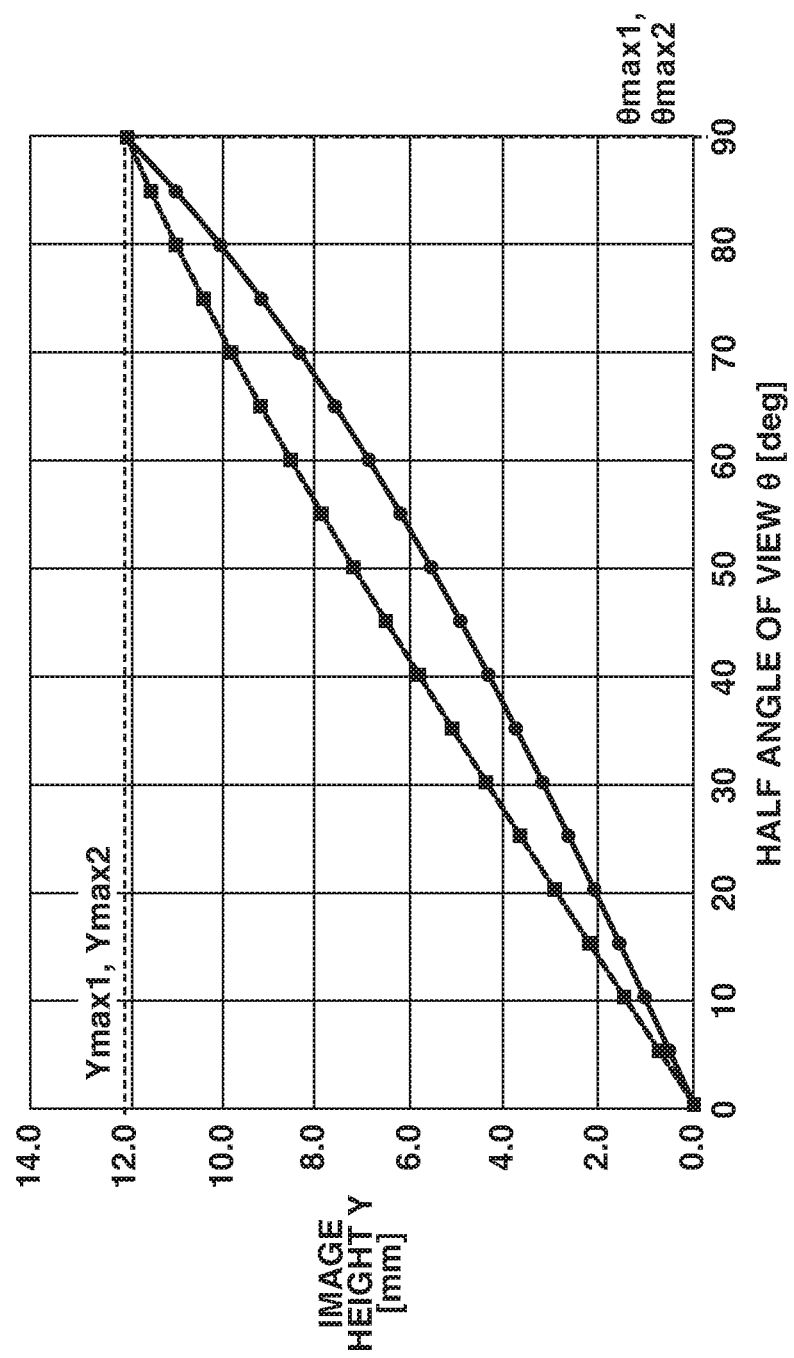
FIG. 8 is a diagram illustrating the relationship between a half angle of view and an image height in the optical system according to the third exemplary embodiment.

FIG. 8 illustrates the image height in the first state and the second state with respect to the half angle of view θ in the optical system L0 according to the present exemplary embodiment. As illustrated in FIG. 8, the imaging state of the optical system L0 according to the present exemplary embodiment is changeable from the first state of equisolid angle projection to the second state of stereographic projection by replacing the partial optical system L2A with the partial optical system L2B.

Further, in FIG. 8, Ymax1 and Ymax2 are the maximum image heights in the first state and the second state, respectively. Further, θmax1 and θmax2 are the maximum half angle of views in the first state and the second state, respectively. As illustrated in FIG. 8, Ymax1 and Ymax2 are substantially equal, and θmax1 and θmax2 are substantially equal. Specifically, in the optical system L0 according to the present exemplary embodiment, the maximum image height and the maximum half angle of view are maintained substantially constant at the time of changing the imaging state between the first state and the second state.

Figure 9A:
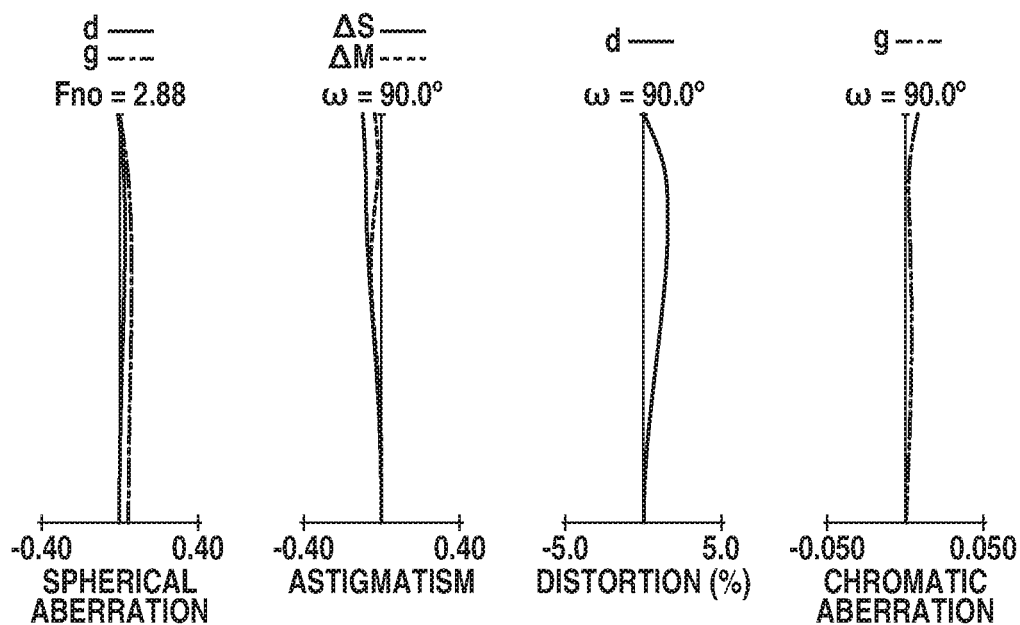
FIGS. 9A and 9B are aberration diagrams illustrating aberrations in the optical system according to the third exemplary embodiment.
Figure 9B:
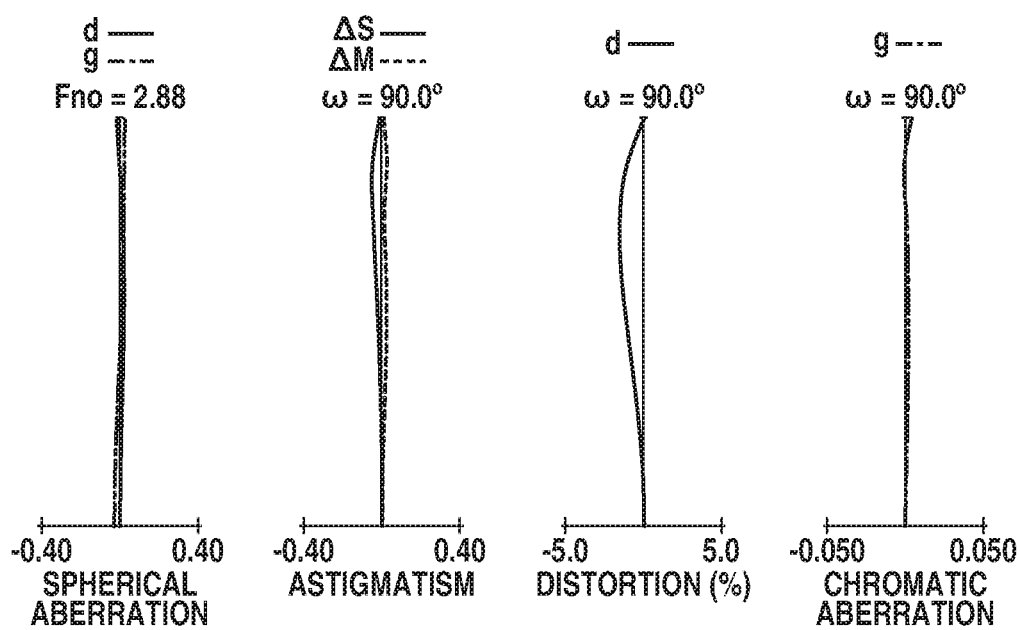

FIGS. 9A and 9B are aberration diagrams illustrating aberrations in the optical system L0 according to the present exemplary embodiment at the time of focusing on an object at infinity in the first state and the second state.

The distortion aberration in the first state is based on the equisolid angle projection, and the distortion aberration in the second state is based on the stereographic projection.

Next, description will be given of first to third numerical examples corresponding to the optical systems in the respective exemplary embodiments. In each numerical example, the surface number is the order of an optical surface counted from the object side. Further, ri is the curvature radius of the i-th (i is a natural number) optical surface (i-th surface) counted from the object side, and di is the interval between the i-th surface and the (i+1)th surface. Further, ndi and vdi are the refractive index, Abbe number, and partial dispersion ratio at the d-line of the i-th lens, respectively.

The Abbe number vd is a value defined by the following conditional expression (A):

$$vd=(Nd-1)/(NF-NC), \quad (A)$$

where NF, Nd, and NC are refractive indexes at the F-line (wavelength 486.1 nm), d-line, and C-line (656.3 nm) of the Fraunhofer lines, respectively.

Further, an asterisk "*" is added at the end of the surface number of each lens surface of an aspherical surface shape in each numerical example. Further, "e±P" in each aspherical surface coefficient indicates "$\times 10^{\pm P}$". The aspherical surface shape of the optical surface is expressed by the following conditional expression (B):

$$x=(h^2/R)/[1+\{1-(1+k)(h/R)^2\}^{1/2}]+A4 \times h^4+A6 \times h^6+A8 \times h^8+A10 \times h^{10}, \quad (B)$$

where x is the amount of displacement from the surface vertex in the optical axis direction, h is the height from the optical axis in the vertical direction with respect to the optical axis direction, R is a paraxial curvature radius, k is a conic constant, and A4, A6, A8, and A10 are aspherical surface coefficients.

First Numerical Example

| Unit mm Surface Data | | | | | |
|---|---|---|---|---|---|
| Surface Number | r | d | nd | vd | Effective Diameter |
| 1 | 99.932 | 4.00 | 1.76385 | 48.5 | 123.84 |
| 2 | 40.000 | 18.84 | | | 76.71 |
| 3* | 144.974 | 3.35 | 1.59522 | 67.7 | 74.04 |
| 4 | 35.732 | (Variable) | | | 56.89 |
| 5 | 33.765 | 1.90 | 1.59522 | 67.7 | 29.31 |
| 6* | 11.603 | (Variable) | | | 20.36 |
| 7* | −68.622 | 1.00 | 1.59522 | 67.7 | 19.00 |
| 8* | 17.187 | 2.63 | | | 18.17 |
| 9 | 39.671 | 6.27 | 1.85478 | 24.8 | 17.90 |
| 10 | −47.710 | (Variable) | | | 16.63 |
| 11 | 31.182 | 3.02 | 1.56122 | 44.6 | 10.99 |
| 12 | −15.079 | 2.00 | 1.80886 | 33.0 | 9.79 |
| 13 | −53.124 | 3.89 | | | 8.54 |
| 14 (Aperture) | ∞ | 1.00 | | | 8.45 |
| 15 | 21.586 | 1.65 | 1.59522 | 67.7 | 8.46 |
| 16 | −259.436 | 1.26 | | | 8.29 |
| 17 | −1918.264 | 1.23 | 1.49700 | 81.5 | 7.98 |
| 18 | −50.078 | 1.10 | 1.61340 | 44.3 | 7.80 |
| 19 | 18.998 | 1.56 | | | 8.66 |
| 20 | 30.256 | 1.00 | 1.85478 | 24.8 | 10.72 |
| 21 | 15.648 | 4.95 | 1.43875 | 94.7 | 11.38 |
| 22 | −36.503 | (Variable) | | | 14.15 |
| 23 | 35.182 | 1.50 | 1.85478 | 24.8 | 20.46 |
| 24 | 20.448 | 7.53 | 1.59522 | 67.7 | 21.05 |
| 25 | −40.003 | 0.15 | | | 22.46 |
| 26 | 20.560 | 5.70 | 1.80400 | 46.6 | 24.84 |
| 27* | 26.120 | (Variable) | | | 22.95 |
| Image Plane | ∞ | | | | |

Aspherical Surface Data

Third Surface

K = 0.00000e+000
A 4 = 5.16945e−006
A 6 = −2.92242e−009
A 8 = 1.08638e−012
A10 = −3.77831e−017

Sixth Surface

K = 0.00000e+000
A 4 = 3.94747e−005
A 6 = 7.77268e−008
A 8 = −4.35018e−009
A10 = 4.38569e−011

Seventh Surface

K = 0.00000e+000
A 4 = −6.44646e−005
A 6 = 1.20102e−007
A 8 = 5.61532e−010
A10 = −1.25473e−011

Eighth Surface

K = 0.00000e+000
A 4 = −1.35635e−004
A 6 = −7.82700e−008
A 8 = 3.79122e−010
A10 = −2.98096e−012

Twenty-seventh Surface

K = 0.00000e+000
A 4 = 4.77288e−006
A 6 = −6.05949e−009
A 8 = −1.35874e−010
A10 = −2.79501e−013

Unit mm
Surface Data

Various Data

|  | Second State | Intermediate State | First State |
|---|---|---|---|
| Focal Length | 5.59 | 7.10 | 7.88 |
| F-number | 2.77 | 2.80 | 2.80 |
| Half Angle of View | 89.94 | 89.94 | 89.36 |
| Image Height | 11.15 | 11.15 | 11.15 |
| Total Lens Length | 129.30 | 112.26 | 104.98 |
| BF | 11.65 | 12.23 | 12.69 |
| d 4 | 22.04 | 6.36 | 1.00 |
| d 6 | 9.20 | 10.83 | 11.37 |
| d10 | 6.87 | 3.17 | 1.00 |
| d22 | 4.02 | 4.16 | 3.40 |
| d27 | 10.92 | 11.50 | 11.96 |
| Entrance Pupil Position | 34.06 | 29.94 | 27.96 |
| Exit Pupil Position | −61.42 | −63.04 | −58.10 |
| Front Principal Point Position | 39.16 | 36.26 | 34.80 |
| Rear Principal Point Position | −4.09 | −5.60 | −6.38 |

Zoom Lens Unit Data

| Unit | First Surface | Focal Length | Lens Configuration Length | Front Principal Point Position | Rear Principal Point Position |
|---|---|---|---|---|---|
| 1 | 1 | −38.02 | 26.19 | 13.38 | −7.80 |
| 2 | 5 | −30.68 | 1.90 | 1.87 | 0.64 |
| 3 | 7 | 535.27 | 9.90 | 89.16 | 99.15 |
| 4 | 11 | 37.36 | 22.65 | 3.36 | −14.72 |
| 5 | 23 | 25.47 | 14.88 | 1.32 | −6.98 |

Single Lens Data

| Lens | First Surface | Focal Length |
|---|---|---|
| 1 | 1 | −89.91 |
| 2 | 3 | −80.59 |
| 3 | 5 | −30.68 |
| 4 | 7 | −22.99 |
| 5 | 9 | 26.21 |
| 6 | 11 | 18.54 |
| 7 | 12 | −26.66 |
| 8 | 15 | 33.55 |
| 9 | 17 | 103.44 |
| 10 | 18 | −22.32 |
| 11 | 20 | −39.15 |
| 12 | 21 | 25.71 |
| 13 | 23 | −59.93 |
| 14 | 24 | 23.84 |
| 15 | 26 | 82.45 |

Second Numerical Example

Unit mm
Surface Data

| Surface Number | r | d | nd | vd | Effective Diameter |
|---|---|---|---|---|---|
| 1 | 132.714 | 2.00 | 1.48749 | 70.2 | 99.10 |
| 2 | 33.585 | 10.54 |  |  | 60.13 |
| 3 | 53.406 | 1.50 | 1.67529 | 59.3 | 58.26 |
| 4 | 24.110 | 19.01 |  |  | 43.52 |
| 5 | −50.122 | 1.50 | 1.43875 | 94.7 | 42.82 |
| 6 | 22.866 | 6.75 |  |  | 36.12 |
| 7 | 65.611 | 3.79 | 1.77104 | 49.6 | 36.37 |
| 8* | 191.883 | (Variable) |  |  | 36.41 |
| 9 | −44.898 | 7.41 | 1.43875 | 94.7 | 36.84 |
| 10* | −29.515 | (Variable) |  |  | 38.27 |
| 11 (Aperture) | ∞ | 0.50 |  |  | 13.35 |
| 12* | 19.205 | 2.40 | 1.62230 | 64.7 | 13.51 |
| 13 | 178.006 | 13.08 |  |  | 13.22 |
| 14 | 27.239 | 1.60 | 1.89246 | 28.4 | 14.74 |
| 15 | 11.257 | 5.07 | 1.43875 | 94.7 | 14.48 |
| 16 | −586.919 | (Variable) |  |  | 15.63 |
| 17 | 28.110 | 3.00 | 1.55332 | 71.7 | 20.91 |
| 18* | 118.344 | (Variable) |  |  | 21.04 |
| Image Plane | ∞ |  |  |  |  |

Aspherical Surface Data

Eighth Surface

K = 1.00496e+002
A 4 = −4.72863e−006
A 6 = −9.63841e−009
A 8 = 2.20544e−011
A10 = −5.91022e−014

Tenth Surface

K = 9.46797e−001
A 4 = 4.57154e−006
A 6 = 5.29316e−009
A 8 = −4.67089e−012
A10 = 6.43843e−014
A12 = −5.45576e−017

Twelfth Surface

K = 0.00000e+000
A 4 = −1.19114e−005
A 6 = −1.43660e−009
A 8 = −2.68917e−010

Eighteenth Surface

K = 0.00000e+000
A 4 = 3.65423e−006
A 6 = −3.00100e−008
A 8 = −6.18983e−010
A10 = 1.45808e−012

Various Data

|  | Second State | First State |
|---|---|---|
| Focal Length | 7.64 | 8.49 |
| F-number | 2.77 | 2.88 |
| Half Angle of View | 90.00 | 90.00 |
| Image Height | 12.00 | 12.00 |
| Total Lens Length | 150.00 | 135.59 |
| BF | 19.48 | 15.45 |
| d 8 | 7.03 | 24.10 |
| d10 | 45.19 | 11.66 |
| d16 | 0.16 | 6.25 |
| d18 | 19.48 | 15.45 |
| Entrance Pupil Position | 29.59 | 28.66 |
| Exit Pupil Position | −25.42 | −38.06 |
| Front Principal Point Position | 35.93 | 35.80 |
| Rear Principal Point Position | 11.84 | 6.96 |

Zoom Lens Unit Data

| Unit | First Surface | Focal Length | Lens Configuration Length | Front Principal Point Position | Rear Principal Point Position |
|---|---|---|---|---|---|
| 1 | 1 | −17.31 | 45.09 | 15.10 | −22.19 |
| 2 | 9 | 171.19 | 7.41 | 13.11 | 8.62 |
| 3 | 11 | 37.42 | 22.64 | −3.96 | −21.01 |
| 4 | 17 | 65.85 | 3.00 | −0.59 | −2.50 |

Unit mm
Surface Data

Single Lens Data

| Lens | First Surface | Focal Length |
|---|---|---|
| 1 | 1 | −92.85 |
| 2 | 3 | −66.46 |
| 3 | 5 | −35.57 |
| 4 | 7 | 127.64 |
| 5 | 9 | 171.19 |
| 6 | 12 | 34.39 |
| 7 | 14 | −22.56 |
| 8 | 15 | 25.24 |
| 9 | 17 | 65.85 |

Third Numerical Example

Unit mm
Surface Data

| Surface Number | r | d | nd | vd | Effective Diameter |
|---|---|---|---|---|---|
| Partial Optical System L1 | | | | | |
| 1 | 70.665 | 3.00 | 1.48749 | 70.2 | 100.00 |
| 2 | 38.430 | 10.86 | | | 69.71 |
| 3 | 50.646 | 2.00 | 2.00069 | 25.5 | 65.20 |
| 4 | 26.480 | 14.83 | | | 48.01 |
| 5 | 492.701 | 2.00 | 1.72916 | 54.7 | 47.77 |
| 6 | 27.655 | 9.79 | | | 38.14 |
| 7 | −151.339 | 1.50 | 1.53775 | 74.7 | 37.56 |
| 8 | 34.463 | (Variable) | | | 35.52 |
| Partial Optical System L2A | | | | | |
| 9 | 43.522 | 8.38 | 1.77250 | 49.5 | 40.69 |
| 10* | −77.114 | 33.00 | | | 40.28 |
| 11 (Aperture) | ∞ | 7.13 | | | 10.89 |
| 12* | 22.293 | 5.87 | 1.55332 | 71.7 | 18.50 |
| 13 | −52.393 | 1.47 | | | 19.32 |
| 14 | 46.959 | 1.60 | 2.00069 | 25.5 | 19.97 |
| 15 | 15.570 | 11.85 | 1.49700 | 81.5 | 19.48 |
| 16 | −17.445 | 3.07 | | | 21.43 |
| 17 | −12.986 | 3.00 | 1.88202 | 37.2 | 21.28 |
| 18* | −21.721 | 12.00 | | | 24.56 |
| Image Plane | ∞ | | | | |
| Partial Optical System L2B | | | | | |
| 9 | −6432.828 | 9.68 | 1.80400 | 46.6 | 41.48 |
| 10* | −31.395 | 30.51 | | | 41.93 |
| 11 (Aperture) | ∞ | 0.50 | | | 8.79 |
| 12* | 125.368 | 1.41 | 1.69680 | 55.5 | 8.76 |
| 13 | −30.746 | 3.86 | | | 8.70 |
| 14 | 45.243 | 1.60 | 2.00069 | 25.5 | 9.96 |
| 15 | 12.771 | 6.73 | 1.49700 | 81.5 | 10.41 |
| 16 | −11.782 | 3.26 | | | 12.69 |
| 17 | −39.942 | 2.00 | 1.88202 | 37.2 | 14.05 |
| 18* | 480.247 | 12.00 | | | 14.96 |
| Image Plane | ∞ | | | | |

Aspherical Surface Data

Partial Optical System L2A

Tenth Surface

K = −1.64734e+001
A 4 = −1.81849e−007
A 6 = 4.15324e−009
A 8 = −5.17461e−012
A10 = 3.79135e−015

Twelfth Surface

K = 0.00000e+000
A 4 = −3.01002e−005
A 6 = −3.87612e−008
A 8 = 1.61665e−010

Eighteenth Surface

K = 0.00000e+000
A 4 = −5.51603e−005
A 6 = −9.82406e−008
A 8 = 5.86199e−010
A10 = −4.69755e−012

Partial Optical System L2B

Tenth Surface

K = −4.19604e−001
A 4 = 6.07258e−006
A 6 = −4.86301e−009
A 8 = 5.67919e−012
A10 = −6.10324e−015
A12 = 3.74542e−018

Twelfth Surface

K = 0.00000e+000
A 4 = −6.22334e−005
A6 = 1.04783e−007
A 8 = −5.83602e−009

Eighteenth Surface

K = 0.00000e+000
A 4 = 4.88753e−005
A 6 = −3.30253e−007
A 8 = 1.41902e−009
A10 = −1.22642e−011

Various Data

| | Second State | First State |
|---|---|---|
| Focal Length | 6.00 | 8.49 |
| F-number | 2.88 | 2.88 |
| Half Angle of View | 90.00 | 90.00 |
| Image Height | 12.00 | 12.00 |
| Total Lens Length | 142.17 | 150.00 |
| BF | 12.00 | 12.00 |
| d 8 | 26.65 | 18.65 |
| Entrance Pupil Position | 32.57 | 33.04 |
| Exit Pupil Position | −14.53 | −29.34 |
| Front Principal Point Position | 37.21 | 39.78 |
| Rear Principal Point Position | 6.00 | 3.51 |

Partial Optical System Data

| Unit | First Surface | Focal Length | Lens Configuration Length | Front Principal Point Position | Rear Principal Point Position |
|---|---|---|---|---|---|
| Partial Optical System L1 | | | | | |
| 1 | 1 | −10.18 | 43.98 | 22.94 | −10.74 |
| Partial Optical System L2A | | | | | |
| 2 | 9 | 47.51 | 75.37 | 64.93 | −75.11 |
| Partial Optical System L2B | | | | | |
| 2 | 9 | 32.10 | 59.55 | 38.98 | −39.02 |

Single Lens Data

| Lens | First Surface | Focal Length |
|---|---|---|
| Partial Optical System L1 | | |
| 1 | 1 | −178.25 |
| 2 | 3 | −57.85 |

-continued

Unit mm
Surface Data

| 3 | 5 | −40.26 |
| 4 | 7 | −52.05 |
| Partial Optical System L2A | | |
| 5 | 9 | 37.14 |
| 6 | 12 | 29.08 |
| 7 | 14 | −23.89 |
| 8 | 15 | 18.79 |
| 9 | 17 | −43.63 |
| Partial Optical System L2B | | |
| 5 | 9 | 39.21 |
| 6 | 12 | 35.57 |
| 7 | 14 | −18.23 |
| 8 | 15 | 13.57 |
| 9 | 17 | −41.73 |

Various values in the respective exemplary embodiments are shown in the following table.

TABLE 1

| | First Exemplary Embodiment | Second Exemplary Embodiment | Third Exemplary Embodiment |
|---|---|---|---|
| Conditional Expression (1) | 1.00 | 1.00 | 1.00 |
| Conditional Expression (2) | 1.01 | 1.00 | 1.00 |
| Conditional Expression (3) | 0.13 | 0.05 | 0.14 |
| Conditional Expression (4) | 1.41 | 1.11 | 1.41 |
| Conditional Expression (6) | 89.36 | 90.00 | 90.00 |
| Conditional Expression (7) | 89.94 | 90.00 | 90.00 |
| Conditional Expression (8) | 1.68 | 2.33 | 3.38 |
| Conditional Expression (9) | 1.40 | 1.12 | 3.08 |
| Conditional Expression (10) | 0.64 | 0.83 | — |
| Conditional Expression (11) | 0.24 (Third Surface) | 0.28 (Tenth Surface) | — |

[Image Capturing Apparatus]

Figure 10:
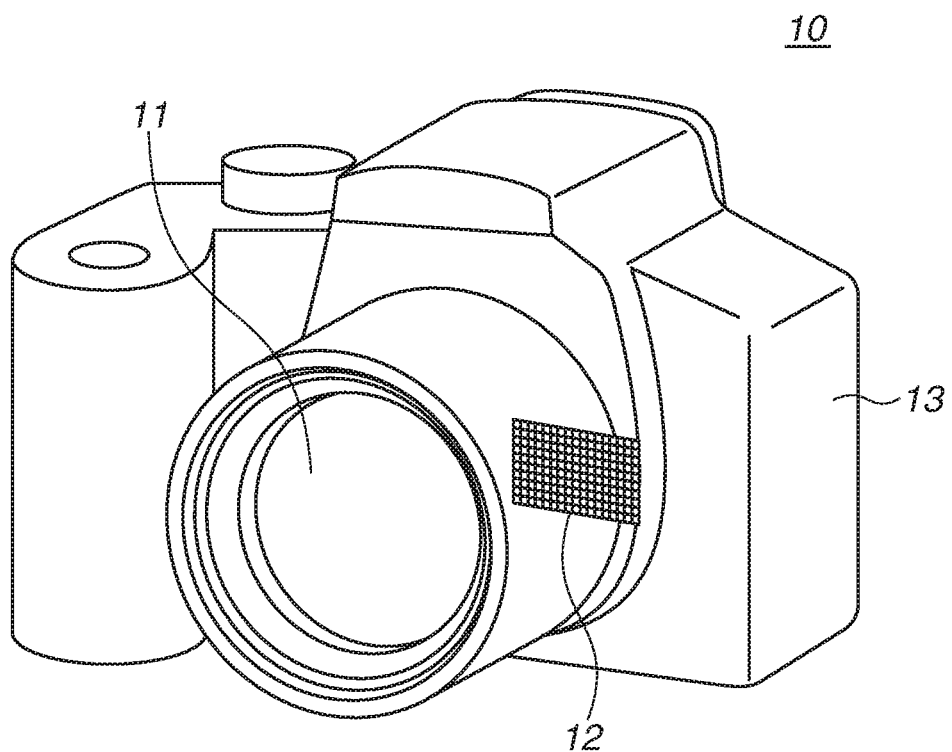
FIG. 10 is a diagram schematically illustrating an image capturing apparatus.

Next, description will be given of an image capturing apparatus according to an exemplary embodiment of the present invention. FIG. 10 is a diagram schematically illustrating an image capturing apparatus (digital still camera) 10 according to the present exemplary embodiment. The image capturing apparatus 10 includes a camera main body 13, a lens apparatus 11, and a light receiving element (image capturing element) 12. The lens apparatus 11 is similar to the lens apparatus in any one of the first to third exemplary embodiments. The light receiving element 12 photoelectrically converts an image formed by an optical system of the lens apparatus 11. The lens apparatus 11 and the camera main body 13 can be integrated or can be configured removably.

The image capturing apparatus 10 according to the present exemplary embodiment includes the lens apparatus 11 to acquire an adequate resolution with respect to a desired subject.

An image capturing element, such as a charge-coupled device (CCD) or complementary metal oxide semiconductor (CMOS) sensor, can be used as the light receiving element 12.

The above-described lens apparatus according to each of the exemplary embodiments is applicable to not only the digital still camera illustrated in FIG. 10 but also various image capturing apparatuses, such as a broadcasting camera, silver-halide film camera, and monitoring camera.

While various exemplary embodiments and examples have been described above, it should be noted that the scope of the invention is not limited to the exemplary embodiments and examples, and various combinations, modifications, and changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-028176, filed Feb. 20, 2018, which is hereby incorporated by reference herein in its entirety.

What is claimed is:

1. A lens apparatus comprising:
an optical system including a plurality of lenses,
wherein the optical system is changeable to a first state in which a focal length of the optical system is a first focal length and a second state in which the focal length of the optical system is a second focal length shorter than the first focal length by changing one or some of the plurality of lenses of the optical system, and
wherein the following conditional expressions are satisfied:

$$0.90 < Y\max1/Y\max2 < 1.10,$$

$$0.90 < \theta\max1/\theta\max2 < 1.10,$$

$$0.04 < \Delta Y\max < 0.50, \text{ and}$$

$$1.05 < fL/fS < 4.00,$$

where Ymax1 is a maximum image height in the first state, Ymax2 is a maximum image height in the second state, θmax1 is a maximum half angle of view in the first state, and θmax2 is a maximum half angle of view in the second state, ΔYmax is a maximum value of ΔY(θ) defined as ΔY(θ) =|Y1(θ)/Ymax1−Y2(θ)/Ymax2|, Y1(θ) is an image height corresponding to a half angle of view θ (0≤θ≤θmax1) in the first state, Y2(θ) is an image height corresponding to a half angle of view θ (0≤θ≤θmax2) in the second state, and fL is the first focal length, and fS is the second focal length.

2. The lens apparatus according to claim 1, wherein the following conditional expressions are satisfied:

$$85° < \theta\max1 < 110, \text{ and}$$

$$85° < \theta\max2 < 110°.$$

3. The lens apparatus according to claim 1, wherein the optical system includes an aperture stop and two or more negative lenses disposed on an object side of the aperture stop.

4. The lens apparatus according to claim 1,
wherein the optical system includes at least one negative lens, and
wherein the following conditional expression is satisfied:

$$1.00 < (G1R1+G1R2)/(G1R1-G1R2) < 4.00,$$

where G1R1 is an object-side curvature radius of a first negative lens G1 which is a negative lens disposed closest to an object side among the negative lens included in the optical system, and G1R2 is an image-side curvature radius of the first negative lens G1.

5. The lens apparatus according to claim 1,
wherein the optical system includes at least two negative lens, and
wherein the following conditional expression is satisfied:

$$0.80 < fG1/fG2 < 3.50,$$

where fG1 is a focal length of a first negative lens G1 which is a negative lens disposed closest to an object side among the negative lens included in the optical system, and fG2 is a focal length of a second negative lens G2 which is a second one of the negative lens included in the optical system in a case of counting the negative lens from an object side.

6. The lens apparatus according to claim 1,
wherein the optical system includes a plurality of lens units, and
wherein an imaging state is changeable between the first state and the second state by changing an interval between adjacent lens units of the plurality of lens units on an optical axis.

7. The lens apparatus according to claim 6,
wherein the following conditional expression is satisfied:

$$0.4 < Mfmax < 1.08,$$

where n is a number of a lens unit among the plurality of lens units included in the optical system in a case of counting the plurality of lens units from an object side to an image side, fLn is a focal length of an n-th lens unit, Mn is an amount of movement associated with a change in the imaging state of the nth lens unit between the first state and the second state, and Mfmax is a maximum value of Mfn with respect to n which is defined as $Mfn=|Mn/fLn|$.

8. The lens apparatus according to claim 6,
wherein the optical system includes an aspherical surface, and
wherein the following conditional expression is satisfied:

$$0.15 < |(hmax - hmin)/EA|,$$

where EA is an effective diameter of the aspherical surface, hmax is a height, from the optical axis, of a position at which a principal ray of an outermost off-axis light ray is incident on the aspherical surface at a time of focusing on an object at infinity in the first state, and hmin is a height, from the optical axis, of a position at which the principal ray of the outermost off-axis light ray is incident on the aspherical surface at the time of focusing on the object at infinity in the second state.

9. The lens apparatus according to claim 6, wherein the optical system includes a first lens unit having a negative refractive power, a second lens unit having a negative refractive power, a third lens unit having a positive refractive power, a fourth lens unit having a positive refractive power, and a fifth lens unit having a positive refractive power which are arranged in this order from an object side to an image side.

10. The lens apparatus according to claim 6, wherein the optical system includes a first lens unit having a negative refractive power, a second lens unit having a positive refractive power, a third lens unit having a positive refractive power, and a fourth lens unit having a positive refractive power which are arranged in this order from an object side to an image side.

11. The lens apparatus according to claim 1, wherein an imaging state is changeable between the first state and the second state by retracting one or some of the plurality of lenses included in the optical system from the optical axis and inserting another lens onto the optical axis.

12. The lens apparatus according to claim 11, further comprising:
a first partial optical system which remains unchanged between the first state and the second state;
a second partial optical system which is disposed on an image side of the first partial optical system and retracted from the optical axis in association with a change in an imaging state between the first state and the second state; and
a third partial optical system which is inserted to the image side of the first partial optical system in an optical path of the optical system in association with the change in the imaging state between the first state and the second state.

13. The lens apparatus according to claim 1, wherein the following conditional expression is satisfied:

$$1.10 < fL/fS < 2.50.$$

14. An image capturing apparatus comprising a lens apparatus and an image capturing element configured to receive an image formed by an optical system of the lens apparatus,
wherein the optical system includes a plurality of lenses,
wherein the optical system is changeable to a first state in which a focal length of the optical system is a first focal length and a second state in which the focal length of the optical system is a second focal length shorter than the first focal length, by changing one or some of the plurality of lenses of the optical system, and
wherein the following conditional expressions are satisfied:

$$0.90 < Ymax1/Ymax2 < 1.10,$$

$$0.90 < \theta max1/\theta max2 < 1.10,$$

$$0.04 < \Delta Ymax < 0.50, \text{ and}$$

$$1.05 < fL/fS < 4.00,$$

where Ymax1 is a maximum image height in the first state, Ymax2 is a maximum image height in the second state, θmax1 is a maximum half angle of view in the first state, and θmax2 is a maximum half angle of view in the second state, ΔYmax is a maximum value of ΔY(θ) defined as $\Delta Y(\theta)=|Y1(\theta)/Ymax1 - Y2(\theta)/Ymax2|$, Y1(θ) is an image height corresponding to a half angle of view θ (0≤θ≤θmax1) in the first state, Y2(θ) is an image height corresponding to a half angle of view θ (0≤θ≤θmax2) in the second state, and fL is the first focal length, and fS is the second focal length.

* * * * *